United States Patent [19]

Ohishi et al.

[11] Patent Number: 5,256,735
[45] Date of Patent: Oct. 26, 1993

[54] PROCESS FOR PREPARING AROMATIC POLYESTER-POLYSTYRENE BLOCK COPOLYMERS

[75] Inventors: Hiroshi Ohishi; Masao Kimura; Shinji Inaba; Masanao Kawabe, all of Kawasaki, Japan

[73] Assignees: Nippon Steel Corporation; Nippon Steel Chemical Co., Ltd., both of Tokyo, Japan

[21] Appl. No.: 774,984

[22] Filed: Oct. 17, 1991

[30] Foreign Application Priority Data

| Oct. 18, 1990 [JP] | Japan | 2-277861 |
| Nov. 16, 1990 [JP] | Japan | 2-308829 |
| Nov. 27, 1990 [JP] | Japan | 2-321239 |
| Dec. 12, 1990 [JP] | Japan | 2-409871 |

[51] Int. Cl.$^5$ ............................................. C08G 63/81
[52] U.S. Cl. .................................... 525/132; 525/177
[58] Field of Search .................................... 525/132

[56] References Cited

U.S. PATENT DOCUMENTS 4,217,427 8/1980 Falk et al.
4,980,418 12/1990 Sasaki et al.

FOREIGN PATENT DOCUMENTS

| 0259868 | 3/1988 | European Pat. Off. |
| 58-157844 | 9/1983 | Japan |
| 58-225113 | 12/1983 | Japan |
| 62-235302 | 10/1987 | Japan |
| 63-83107 | 4/1988 | Japan |
| 1-129011 | 5/1989 | Japan |

OTHER PUBLICATIONS

Patent Abstracts of Japan, vol. 13, No. 379 (C-628) (3727) 22 Aug. 1989, (Abstract for JP-A-1 129 011 (Mitsubishi Rayon Co. Ltd) 22 May 1989).

*Primary Examiner*—Patricia A. Short
*Attorney, Agent, or Firm*—Armstrong, Westerman, Hattori, McLeland & Naughton

[57] ABSTRACT

A process is disclosed for the preparation of aromatic polyester-polystyrene block copolymers by solution polycondensation of styrene polymers (A) having terminal functional groups reactive with acid halide or hydroxyl groups, aromatic dihydroxy compounds (B), and aromatic dicarboxylic acid dihalides (C) at (A)/[(B)+(C)] (by weight) of 5/95 to 80/20 and the polymers are suitable as molding materials for optical instruments for their good transparency, particularly low birefringence, low melt viscosity, and good mechanical strength.

6 Claims, No Drawings

PROCESS FOR PREPARING AROMATIC POLYESTER-POLYSTYRENE BLOCK COPOLYMERS

FIELD OF THE INVENTION AND RELATED ART STATEMENT

This invention relates to a process for preparing aromatic polyester-polystyrene block copolymers which are useful as materials for optical instruments.

Aromatic polyesters, in general, are highly transparent and suitable as materials for optical instruments and also have excellent heat resistance and mechanical strength. They are, however, difficult to process because of their high melt viscosity. In addition, the stress from thermal processing such as injection molding generates strain in the resins and such strain induces birefringence in the molded articles, causing readout errors and noises in optical disks and optical guard protective membranes or increases in the transmission loss in optical fibers.

Remedial processes are known for the aforesaid problems; for example, one is based on the chemical combination of aromatic polyesters (hereinafter often abbreviated as PAr) and styrene polymers (hereinafter often abbreviated as PS), positive birefringence against negative, and the other is based on the addition of such chemically combined PS-PAr resins as compatibilizer to PS/PAr blends. Processes for the preparation of aromatic polyester-polystyrene block copolymers are disclosed, for example, in Japan Kokai Tokkyo Koho Nos. 58-157,844 (1983), 58-225,113 (1983) and U.S. Pat. No. 4,980,418. According to these processes, unsaturated groups are introduced to the ends of aromatic polyesters and then allowed to polymerize with styrene monomers to yield aromatic polyester-polystyrene block copolymers. In consequence, the proportion of styrene monomers not copolymerizing with the terminally unsaturated polyesters increases and the resulting polymers as formed show low mechanical strength. A separating step will therefore be required for the removal of such uncopolymerized polystyrene and this will make the process unsuitable for commercial application. According to a process disclosed in Japan Kokai Tokkyo Koho No. 1-129,011 (1989), styrene monomer and allylamine are polymerized and melt-blended with aromatic polyesters at high temperature (260°-340° C.) to prepare aromatic polyester-polystyrene block copolymers. With this process, however, the polyester chain is first cleaved and then copolymerized with allylamine-modified styrene polymers and the resulting polymers contain short aromatic polyester segments and do not have sufficient strength.

OBJECT AND SUMMARY OF THE INVENTION

This invention offers a solution to the aforesaid problems in aromatic polyester polystyrene block copolymers for molding optical instruments and its object is to provide aromatic polyester-polystyrene block copolymers with a minimum content of uncopolymerized styrene polymers.

Another object of this invention is to provide a process for preparing aromatic polyester-polystyrene block copolymers with high transparency, particularly low birefringence, low melt viscosity, and good mechanical strength.

This invention accordingly relates to a process for preparing aromatic polyester-polystyrene block copolymers which comprises polycondensing in solution styrene polymers (A) having terminal functional groups reactive with acid halide or hydroxyl groups, aromatic dihydroxy compounds (B), and aromatic dicarboxylic acid dihalides (C) at the ratio (A)/[(B)+(C)] by weight of 5/95 to 80/20.

The styrene polymers (A) to be used in this invention have functional groups at the ends or at the ends and at some internal sites, preferably at one or both ends, more preferably at both ends for enhanced reactivity.

The functional groups in the styrene polymers (A) are capable of reacting with the hydroxyl groups of the aromatic dihydroxy compounds (B) or the acid halide groups of the aromatic dicarboxylic acid dihalides (C). For example, the functional groups reactive with hydroxyl are acid halide (—COX, X=halogen atom) and carboxyl (—COOH) and those reactive with acid halide are hydroxyl (—OH) and amino (—NH$_2$). The acid halide, hydroxyl, and amino groups are preferable on account of their relatively high reactivity. The halogen atom (X) in acid halide (—COX) is preferably chlorine, bromine, or iodine, more preferably chlorine or bromine. In the cases where the styrene polymers (A) have functional groups of low reactivity, the aromatic dihydroxy compounds (B) react preferentially with the aromatic dicarboxylic acid dihalides (C) and there is a tendency a large proportion of the styrene polymers (A) remains unreacted.

The styrene monomers making up the styrene polymers (A) include styrene, alkylstyrenes such as o-, m-, and p-methylstyrene, o-, m-, and p-ethylstyrene, and p-tert-butylstyrene, halostyrenes such as o-, m-, and p-chlorostyrene, dichlorostyrenes, bromostyrene, and dibromostyrenes, and α-methylstyrene, and a mixture thereof. The styrene polymers may be copolymers of styrene monomers with 0 to 50%, preferably 0 to 20%, of other vinyl monomers, for example, methacrylate esters, acrylate esters, vinyl acetate, butadiene, maleic acid anhydride and acrylonitrile, for property improvement.

The styrene polymers (A) desirably have a number average molecular weight $\overline{Mn}$ of 1,000 or more to 200,000 or less as determined by gel permeation chromatography (GPC). Polymers with $\overline{Mn}$ of less than 1,000 do not yield copolymers of satisfactory mechanical properties while polymers with $\overline{Mn}$ in excess of 200,000 present difficulties in the synthesis of copolymers. It is also desirable to control the radio of the weight average molecular weight $\overline{Mw}$ to $\overline{Mn}$ ($\overline{Mw}/\overline{Mn}$) at 4.0 or less, more desirably 1.0 to 3.0. Styrene polymers with $\overline{Mw}/\overline{Mn}$ in excess of 4.0 cannot be used advantageously as they do not produce copolymers of uniform molecular weight.

The styrene polymers (A) having terminal functional groups to be used in this invention are prepared by polymerizing styrene monomer or styrene monomer and other vinyl monomers with the use of a polymerization initiator or a chain-transfer agent having identical or different functional groups or by allowing these functional group-containing compounds to react with styrene living polymers, although the preparatory methods are not limited to those mentioned above.

Typical examples are cited below for the preparation of the styrene polymers (A) having terminal functional groups.

Processes are known for the preparation of carboxyl-containing styrene polymers by the polymerization of styrene monomer with the use of a carboxyl-containing polymerization initiator. The processes for preparing carboxyl-terminated styrene polymers described in Japan Kokai Tokkyo Koho Nos. 62-235,302 (1987) and 63-83,107 (1988) may be adopted.

Processes are also known for the synthesis of acid halide-terminated styrene polymers by heating a mixture of the aforesaid carboxyl-terminated styrene polymers and thionyl chloride to effect dehydrochlorination or by subjecting styrene monomer to living polymerization in the presence of an anionic catalyst such as butyllithium and lithiumnaphthalene and then treating the resulting polymers with an excess of phosgene.

Styrene polymers with terminal hydroxyl groups, for example, those with phenolic hydroxyl groups, are synthesized by esterifying the aforesaid carboxyl-terminated styrene polymers with an excess of a diphenol such as 2,2-bis(4-hydroxyphenyl)propane (hereinafter referred to as "bisphenol A") in a solvent in the presence of a suitable catalyst and an acid scavenger.

Alcoholic hydroxyl-terminated styrene polymers can be prepared by the polymerization of styrene monomer with the use of an alcoholic hydroxyl-containing initiator such as 2,2'-azobis(2-cyanopropanol) and 2,2'-azobis{2-[1-(2-hydroxyethyl)-2-imidazolin-2-yl]propane} dichloride or a hydroxyl-containing chain-transfer agent such as mercaptoethanol and mercaptopropanediol.

Amino-terminated styrene polymers can be prepared by the amidation of the aforesaid carboxyl-terminated styrene polymers with an excess of a diamine such as 4,4'-diaminodiphenyl ether in a solvent in the presence of a suitable catalyst and an acid scavenger or by the radical polymerization of styrene monomer with the use of an amino-containing initiator (for example, VA-088 available from Wako Pure Chemical Industries, Ltd.).

It is to be understood here that the functional group-terminated styrene polymers are not limited to those prepared as cited above and styrene polymers having terminal groups reactive with hydroxyl or acid halide groups are applicable.

The functional groups may be linked to the ends of the styrene polymers directly or through other intervening groups. For example, the aforesaid hydroxyl-terminated styrene polymers are treated with a diacid dihalide such as terephthaloyl dichloride to yield acid halide-terminated styrene polymers or acid halide-terminated styrene polymers are treated with a dihydroxy compound such as bisphenol A to yield hydroxyl-terminated styrene polymers.

The aromatic dihydroxy compounds (B) to be used in this invention have two hydroxyl groups linked to an aromatic ring structure and their examples include bisphenol A, tetramethylbisphenol A, tetrabromobisphenol A, bis(4-hydroxyphenyl)-p-diisopropylbenzene, bis(4-hydroxyphenyl)methane, hydroquinone, resorcinol, 4,4'-dihydroxybiphenyl, and 2,6-dihydroxynaphthalene, and a mixture thereof. Of these, bisphenol A is preferable.

The aromatic dicarboxylic acid dihalides (C) to be used in this invention have two acid halide groups linked to an aromatic ring structure and their examples include terephthaloyl chloride, terephthaloyl bromide, isophthaloyl chloride, and isophthaloyl bromide, and their ring-halogenated derivatives, 4,4'-biphenyldicarboxylic acid dihalides, 4,4'-benzophenonedicarboxylic acid dihalides, 4,4'-diphenylsulfonedicarboxylic acid dihalides, 2,6-naphthalenedicarboxylic acid dihalides, and a mixture thereof. Of these, terephthaloyl chloride and isophthaloyl chloride mixed at a ratio of 25:75 to 75:25 are particularly desirable. The halogen atom is the acid halides may be chlorine, bromine, or iodine, chlorine being preferable. It is allowable for the aromatic dihydroxy compounds (B) or aromatic dicarboxylic acid dihalides (C) to contain aliphatic dicarboxylic acid dihalides or aliphatic dihydroxy compounds in small quantities.

The proportion of the styrene polymers (A), aromatic dihydroxy compounds (B), and aromatic dicarboxylic acid dihalides (C) may be varied in a wide range. It is, however, necessary to control the content of styrene polymers at 5 to 80% by weight in order to obtain good optical and mechanical properties. For this purpose, the ratio by weight of the styrene polymers (A) to the sum of the aromatic dihydroxy compounds (B) and the aromatic dicarboxylic acid dihalides (C) or (A)/[(B)+(C)] is controlled in the range from 5/95 to 80/20, preferably from 20/80 to 70/30. The use of less than 5% of the styrene polymers cannot lower the birefringence of the copolymers sufficiently while the use of more than 80% decreases the toughness of the copolymers. The aromatic dihydroxy compounds (B) and the aromatic dicarboxylic acid dihalides (C) are used in roughly equimolar quantities. In the cases where the styrene polymers (A) have acid halide-reactive functional groups such as amino and hydroxyl groups, it is desirable to use the aromatic dicarboxylic acid dihalides (C) in that much molar excess. On the other hand, where the functional groups are hydroxyl-reactive ones such as acid halides, the aromatic dihydroxy compounds (B) are used in that much molar excess. It is, however, hardly necessary to take this manipulation into account when the molecular weight of the styrene polymers (A) is sufficiently high.

The solution polycondensation according to this invention is effected by dissolving the styrene polymers (A), the aromatic dihydroxy compounds (B), and an acid scavenger such as an alkali metal compound and an organic amine in an organic solvent and adding thereto with stirring a solution of the aromatic dicarboxylic acid dihalides (C) in said organic solvent.

The organic solvents in question are desirably inert to the styrene polymers (A), the aromatic dihydroxy compounds (B), and the aromatic dicarboxylic acid dihalides (C) and are good solvents of these three as well as the aromatic polyester-polystyrene block copolymers produced therefrom. Such organic solvents include halohydrocarbons, aromatic hydrocarbons, esters, and ketones and concrete examples are methylene chloride, chloroform, tetrachloroethane, chlorobenzene, dichlorobenzene, benzene, toluene, xylene, methyl ethyl ketone, ethyl acetate, and dioxane. The acid scavengers include hydroxides of alkali metals and alkaline earth metals such as sodium hydroxide, potassium hydroxide, and calcium hydroxide and tertiary amines such as triethylamine and trimethylamine and their mixture.

The solution polycondensation is carried out with stirring at −10° to 60° C., preferably at 5° to 50° C., for 5 minutes to 20 hours, preferably 1 to 10 hours.

In the solution polycondensation of this invention, a quaternary ammonium salt such as trimethylbenzylammonium chloride and triethylbenzylammonium chloride may be added for smooth progress of the polymerization reaction. A monofunctional phenolic compound such as o-phenylphenol and p-tert-butylphenol may also be added for control of the molecular weight.

The general procedure described above is readily applicable to the cases where the styrene polymers have terminal functional groups such as acid halide, phenolic hydroxyl, and amino and show relatively high reactivity compared with the other comonomers, aromatic dicarboxylic acid dihalides or aromatic dihydroxy compounds. Where the functional groups, such as carboxyl or alcoholic hydroxyl groups, have relatively low reactivity with hydroxyl groups and acid halide groups, however, a larger proportion of the styrene polymers tends to remain unreacted and the polymerization in such a case is desirably carried out in the following manner.

Basically, the styrene polymers (A) having terminal groups of relatively low reactivity such as alcoholic hydroxyl and carboxyl is allowed to react with the aromatic dicarboxylic acid dihalides and the aromatic dihydroxy compounds in an organic solvent in the presence of 0.01 to 50 parts by weight of an acid scavenger to yield polyesters. Firstly, the temperature is $-10°$ to $60°$ C. and the reaction time is 10 minutes to 10 hours. Thereafter, the reaction temperature is raised to cause the polyesters to react with the unchanged styrene polymers (A) to yield aromatic polyester-polystyrene block copolymers. The temperature for this phase of the reaction is $60°$ to $110°$ C., most preferably $70°$ to $90°$ C., and the time is 2 to 50 hours, preferably 20 to 30 hours. Moreover, it is desirable during this phase to add 4-dimethylaminopyridine, a good esterification catalyst, in the range from 0.01 to 10 parts by weight.

Alternatively, functional group-terminated styrene polymers of low reactivity, for example, alcoholic hydroxyl-terminated styrene polymers, are allowed to react with an excess of aromatic dicarboxylic acid dihalides in a solvent in the presence of an acid scavenger to yield acid halide-terminated styrene polymers (A), which are then allowed to react with the aromatic dihydroxy compounds (B) and the aromatic dicarboxylic dihalides (C) or carboxyl-terminated styrene polymers are allowed to react with an excess of aromatic dihydroxy compounds in the presence of a catalyst to yield phenolic hydroxyl-terminated styrene polymers (A), which are then allowed to react with the aromatic dihydroxy compounds (B) and the aromatic dicarboxylic acid dihalides (C). These procedures, however, merely have an additional step for the preparation of the functional group-terminated styrene polymers (A) and constitute one operational mode of the general procedure described earlier.

Alternate reaction of the terminal functional groups in the styrene polymers (A) with the aromatic dihydroxy compounds (B) and the aromatic dicarboxylic acid dihalides (C) in the polycondensation leads to the formation of block copolymers of the styrene polymers and polyesters, that is, aromatic polyester-polystyrene block copolymers. The ratio by weight of the styrene polymer segments (PS) to the polyester segments (PAr) in the aromatic polyester-polystyrene block copolymers depends on the quantities of the raw materials, namely styrene polymers (A), aromatic dihydroxy compounds (B), and aromatic dicarboxylic acid dihalides (C). The ratio PS/PAr is normally in the range from 5/95 to 20/80, preferably from 25/75 to 65/35 from the viewpoint of optical and mechanical properties.

The product block copolymers can be separated and purified by a variety of known procedures. For example, upon completion of the polycondensation, the reaction solution is filtered to separate inorganic salts, washed or extracted, if necessary, and then mixed with a poor solvent such as acetone, methanol, hexane, ethanol, cyclohexane, and water to separate the polymers, which are collected by filtration and dried. The unreacted styrene polymers remaining in the block copolymers may be removed by selectively dissolving them in a solvent such as cyclohexane.

It is desirable for the aromatic polyester-polystyrene block copolymers of this invention to have $\overline{Mn}$ of 1,000 to 300,000 as determined by GPC. Block copolymers with $\overline{Mn}$ of less than 1,000 do not show satisfactory properties while those with $\overline{Mn}$ in excess of 300,000 occur as gel and the solvent therein contained becomes difficult to remove.

The aromatic polyester-polystyrene block copolymers of this invention show low melt viscosity and high transparency and can be used neat as materials of low birefringece for optical instruments.

According to the process of this invention, the functional group-terminated styrene polymers (A), the aromatic dihydroxy compounds (B), and the aromatic dicarboxylic acid dihalides (C) react with one another in the presence of an acid scavenger to yield aromatic polyester-polystyrene block copolymers without isolation of the intermediates and the ratio of the aromatic polyester segments to the polystyrene segments can be varied with ease. Furthermore, the process of this invention can reduce the quantity of uncopolymerized styrene polymers and yield aromatic polyester-polystyrene block copolymers which show lower birefringence than aromatic polyesters even when stretched. The process of this invention is therefore commercially useful for the preparation of aromatic polyester-polystyrene block copolymers. The block copolymers in question can be utilized as materials of good quality for optical instruments and are also useful as compatibilizer in blending of aromatic polyesters and styrene polymers to improve the tensile strength, flexural strength, and flexural modulus of the blends.

DETAILED DESCRIPTION OF THE PREFERRED EMBODIMENTS

This invention will be explained in detail with reference to the accompanying examples and comparative examples.

EXAMPLES 1 AND 2

Styrene was subjected to radical polymerization at $90°$ C. by adding a solution of 4,4'-azobis(4-cyanovaleric acid) (ACVA) in 1,4-dioxane at the start of the polymerization and also continuously during the polymerization to yield two kinds of carboxyl-terminated polystyrene (A1' with $\overline{Mn}=15,000$, $\overline{Mw}=33,000$, and 2.01 carboxyl groups/molecule and A2' with $\overline{Mn}=30,000$, $\overline{Mw}=65,000$, and 1.98 carboxyl groups/molecule).

The measurement of $\overline{Mn}$ and $\overline{Mw}$ was made by GPC calibrated with monodisperse polystyrene (product of Waters Associates, Inc.) at an elution rate of 1.0 ml./min. using tetrahydrofuran as mobile phase and a refractive index (RI) detector. The average number of carboxyl groups in a polymer molecule is determined by titration with an aqueous sodium hydroxide solution.

The styrene polymers A1' and A2' are treated with thionyl chloride to give two kinds of acid chloride-terminated styrene polymers (A1 with 1.98 terminal acid chloride groups/molecule and A2 with 2.01 terminal acid chloride groups/molecule). The quantity of the terminal acid chloride groups was determined by analyzing chlorine with the aid of a fluorescent X-ray analyzer.

Into a glass flask fitted with a stirrer, a reflux condenser, a dropping funnel, and a nitrogen gas inlet were introduced 15 g. of bisphenol A and 11.8 g. of calcium hydroxide and dissolved in 150 ml. of 1,2-dichloroethane. The solution was stirred by blowing nitrogen gas into it at room temperature for 20 minutes, 0.5 ml. of triethylamine was added, and a solution of 6.739 g. each of terephthaloyl chloride and isophthaloyl chloride and 35 g. of polystyrene A1 or polystyrene A2 in 150 ml. of 1,2-dichloroethane was added over 12 minutes with the temperature inside the flask kept at 32° C. After completion of the addition, the temperature inside the flask was kept at 32° C. and the mixture was allowed to polymerize with stirring for 4 hours. Upon completion of the polymerization, the solution was filtered, the filtrate was mixed with chloroform and added to 3 l. of methanol, and the precipitated polymers were recovered by filtration and dried in a vacuum dryer at 1 mmHg and 70° C. for 3 days.

The determination of $\overline{Mn}$, $\overline{Mw}$, and $\overline{Mw}/\overline{Mn}$ of the recovered polymers was made by GPC. The polymers were identified as aromatic polyester-polystyrene block copolymers by extracting 1 part by weight of the polymers with 50 parts by weight of cyclohexane for 26 hours in a Soxhlet extractor and checking the composition of the cyclohexane-insoluble fraction by NMR (nuclear magnetic resonance) spectroscopy. The uncopolymerized styrene polymers are soluble in cyclohexane. The results are as follows. Here, polystyrene A1 was used in Example 1 and polystyrene A2 in Example 2.

| Example 1: | Example 2: |
|---|---|
| $\overline{Mn}$ = 46,000 | $\overline{Mn}$ = 70,000 |
| $\overline{Mw}$ = 93,000 | $\overline{Mw}$ = 180,000 |
| $\overline{Mw}/\overline{Mn}$ = 2.06 | $\overline{Mw}/\overline{Mn}$ = 2.60 |
| Conversion = 85% | Conversion = 89% |
| Polymer composition | Polymer composition |
| PS:PAr = 35:65 | PS:PAr = 30:70 |
| Unreacted PS = 25% | Unreacted PS = 32% |

EXAMPLES 3 and 4

The carboxyl-terminated polystyrene A1' prepared in Example 1 was treated with an excess of 4,4'-diaminodiphenyl ether to give amino-terminated polystyrene A3 according to the method of S. Yasuda and coworkers [J. Polym. Sci., Polym. Chem. ED., 21, 2609 (1983)] by using triphenylphosphine and hexachloroethane as catalyst and triethylamine as acid scavenger. Similarly, amino-terminated polystyrene A4 was prepared from polystyrene A2'. The styrene polymers A3 and A4 were submitted to the determination of $\overline{Mn}$, $\overline{Mw}$, and number of amino groups. The results are as follows.

| A3: | A4: |
|---|---|
| $\overline{Mn}$ = 29,000 | $\overline{Mn}$ = 53,000 |
| $\overline{Mw}$ = 67,000 | $\overline{Mw}$ = 110,000 |
| No. of amino groups = 1.89/molecule | No. of amino groups = 2.13/molecule |

The number of terminal amino groups was determined by acetylation in a known manner.

Into a glass flask fitted with a stirrer, a reflux condenser, a dropping funnel, and a nitrogen gas inlet were introduced 20 parts by weight of bisphenol A, 50 parts by weight of the aforesaid polystyrene A3 or A4 and 15 parts by weight of calcium hydroxide, dissolved in 550 parts by weight of 1,2-dichloroethane, and stirred at room temperature for 20 minutes by blowing nitrogen gas into the solution. Thereafter, 0.1 part by weight of triethylamine was added and a solution of 7.5% by weight each of phthaloyl chloride and isophthaloyl chloride or 15% by weight of total acid halides in 150 parts by weight of 1,2-dichloroethane was added over 12 hours with the temperature inside the flask kept at 32° C. After the addition, the temperature inside the flask was kept at 32° C. and the mixture was allowed to polymerize with stirring for 4 hours. Upon completion of the polymerization, the solution was filtered, the filtrate was mixed with chloroform and added to 3,000 parts by weight of methanol, and the polymers precipitated were collected by filtration and dried at 1 mmHg and 70° C. in a vacuum dryer for 3 days.

The recovered polymers were analyzed as in Examples 1 and 2. The results are as follows.

| Example 3: | Example 4: |
|---|---|
| $\overline{Mn}$ = 35,000 | $\overline{Mn}$ = 80,000 |
| $\overline{Mw}$ = 140,000 | $\overline{Mw}$ = 170,000 |
| $\overline{Mw}/\overline{Mn}$ = 3.98 | $\overline{Mw}/\overline{Mn}$ = 2.23 |
| Conversion = 98% | Conversion = 95% |
| Polymer composition | Polymer composition |
| PS:PAr = 53:47 | PS:PAr = 56:44 |
| Unreacted PS = 7% | Unreacted PS = 9% |

(Notes)
PS: Polystyrene segments
PAr: Polyarylate segments

The results indicate that the recovered polymers are aromatic polyester-polystyrene block copolymers. Polystyrene A3 was used in Example 3 and polystyrene A4 in Example 4.

EXAMPLES 5 and 6

Radical polymerization of 100 parts by weight of styrene was effected at 90° C. with the use of ACVA as polymerization initiator. ACVA was dissolved in 1,4-dioxane and added in the initial stage of the polymerization and also continuously during the polymerization. The concentration of ACVA initially added and that of ACVA continuously added were varied as shown in Table 1 to yield two kinds of carboxyl-terminated polystyrene A5' and A6'.

TABLE 1

| Styrene monomer (wt. part) | 100 | 100 |
|---|---|---|
| ACVA initially added (wt. part) [solvent (wt. part)] | 2.7 [83.3] | 0.2 [13.9] |
| ACVA continuously added (wt. part) [solvent (wt. part)] | 5.0 [150] | 0.9 [50] |
| Rate of continuous addition (wt. part/min.) | 0.83 | 0.27 |
| Styrene polymer | A5' | A6' |
| $\overline{Mn}$ | 4,400 | 41,000 |
| $\overline{Mw}$ | 12,000 | 87,000 |
| $\overline{Mw}/\overline{Mn}$ | 2.80 | 2.14 |
| Number of carboxyl groups (in | 1.40 | 1.92 |

TABLE 1-continued

| | | |
|---|---|---|
| one molecule) | | |
| Conversion (%) | 69.3 | 79.5 |

The aforesaid polystyrene A5' was allowed to react with an excess of bisphenol A to yield phenolic hydroxyl-terminated polystyrene A5 according to the method of S. Yasuda and coworkers [J. Polym. Sci., Polym. Chem. ED., 21, 2609 (1983)] by using triphenylphosphine and hexachloroethane as catalyst and triethylamine as acid scavenger. Similarly, polystyrene A6' was converted to phenolic hydroxyl-terminated polystyrene A6. The terminal hydroxyl groups were analyzed by dissolving the polymers in an acetic acid solution of titanium tetrachloride and colorimetrically determining the developed color at 546 nm. The experimental conditions and results are shown in Table 2.

TABLE 2

| | | |
|---|---|---|
| Triphenylphosphine (wt. part) [solvent (wt. part)] | 1.8 [10] | 0.9 [10] |
| Hexachloroethane (wt. part) [solvent (wt. part)] | 1.7 [10] | 0.8 [10] |
| Bisphenol A (wt. part) [solvent (wt. part)] | 2.7 [450] | 1.0 [150] |
| Triethylamine (wt. part) | 1.2 | 0.4 |
| Styrene polymer | A5 | A6 |
| OH group (milliequiv./g.) | 0.294 | 0.043 |

Into a glass flask fitted with a stirrer, a reflux condenser, a dropping funnel, and a nitrogen gas inlet were introduced 20 parts by weight of bisphenol A, 50 parts by weight of polystyrene A5 or polystyrene A6, and 15 parts by weight of calcium hydroxide, dissolved in 550 parts by weight of 1,2-dichloroethane, and stirred at room temperature for 20 minutes by blowing nitrogen gas into the solution. Then, 0.1 part by weight of triethylamine was added and a solution of 7.5% by weight each of terephthaloyl chloride and isophthaloyl chloride or 15% by weight of total acid chlorides in 150 parts by weight of 1.2-dichloroethane was added over 12 hours with the temperature inside the flask kept at 32° C. After the addition, the temperature inside the flask was kept at 32° C. and the mixture was allowed to polymerize with stirring for 4 hours. Upon completion of the polymerization, the solution was filtered and the filtrate was mixed with chloroform and added to 3,000 parts by weight of methanol to precipitate the polymers. The polymers were collected by filtration and dried at 1 mmHg and 70° C. in a vacuum dryer for 3 days.

The polymers were analyzed as in Example 1 and the results are shown in Table 3.

TABLE 3

| | Example 5 | Example 6 |
|---|---|---|
| $\overline{Mn}$ | 15,000 | 51,000 |
| $\overline{Mw}$ | 38,000 | 130,000 |
| $\overline{Mw}/\overline{Mn}$ | 2.54 | 2.55 |
| Cyclohexane extraction: insolubles/solubles (wt. ratio) | 85:15 | 88:12 |
| Polymer composition (PS:PAr) | 40:60 | 45:55 |

The inherent viscosity ($\eta$) of the polymer synthesized in Example 5 was 0.70 when measured at 25° C. in a 1:1 mixture by volume of tetrachloroethane and phenol. The melt viscosity of the polymer was also measured by a flow tester at 325° C. and varying shear rate; 21,000 poises at 80 1/sec., 3,800 poises at 1,500 1/sec., and 1,200 poises at 10,500 1/sec.

Each of the polymers prepared in Examples 1 to 6 was dissolved in methylene chloride to a concentration of 20% by weight and formed into a 100 $\mu$m-thick film on a glass plate with the aid of Automatic Film Applicator No. 542-AB-S manufactured by Yasuda Seiki Seisakusho Ltd. The film was left at room temperature for 12 hours and then stripped of the solvent by heating in a vacuum dryer at 100° C. for 12 hours.

After stripping the solvent, the obtained film was cooled to a room temperature and then peeled from the glass plate by leaving in water. Any damages of the film were not observed while peeling the film from the glass plate, and samples for a stretching test having a size of 20 mm × 60 mm were obtained.

The film thus obtained was stretched 10 to 50% at 215° to 220° C. in a hot-air circulation type uniaxial stretching machine manufactured by Satake Chemical Equipment Mfg. Co., Ltd. and the birefringence of the film was determined at 546 nm by an optical-pol polarizing microscope manufactured by Nikon Corporation. The results are shown in Table 4.

Comparative Example 1

A film was prepared as above from 100 g. of commercially available aromatic polyester (U-Polymer U-100, trademark of Unitika Ltd.), stretched, and submitted to the measurement of its birefringence. The results are shown in Table 4.

TABLE 4

| | 10% Stretching | 30% Stretching | 50% Stretching |
|---|---|---|---|
| Example 1 | 0.33E-2 | 0.45E-2 | 0.78E-2 |
| Example 2 | 0.67E-2 | 0.60E-2 | 0.91E-2 |
| Example 3 | 0.12E-2 | 0.32E-2 | 0.47E-2 |
| Example 4 | 0.33E-2 | 0.40E-2 | 0.51E-2 |
| Exampel 5 | 0.49E-2 | 0.51E-2 | 0.73E-2 |
| Example 6 | 0.49E-2 | 0.55E-2 | 0.71E-2 |
| Comparative example 1 | 1.10E-2 | 1.30E-2 | 2.48E-2 |

EXAMPLE 7

Alcoholic hydroxyl-terminated polystyrene A7 was prepared by polymerizing styrene in the presence of 2,2'-azobis(2-cyanopropanol), an alcoholic hydroxyl group-containing initiator. The polymer showed $\overline{Mn}$ of 5,100 and a molecular weight distribution of 2.01 and contained two hydroxyl groups on the average in a molecule. The hydroxyl group was determined by treating the polymer with trimethylchlorosilane and analyzing the resulting silyl ether by $^1$H-NMR spectroscopy.

Into a flask were introduced 2 g. (0.39 millimole) of alcoholic hydroxyl-terminated polystyrene A7 prepared above, 1.3 g. (5.69 millimoles) of bisphenol A, 2 g. (27 millimoles) of calcium hydroxide, 5 $\mu$l. of triethylamine, and 15 ml. of 1,2-dichloroethane and stirred in a stream of nitrogen. The solution was stirred for 20 minutes and a mixture of 0.62 g. (3.05 millimoles) of terephthaloyl chloride and 0.62 g. (3.05 millimoles) of isophthaloyl chloride was added in drops over 10 minutes so that the reaction temperature might not exceed 40° C. The mixture was thereafter stirred at room temperature for 4 hours, 30 mg. (0.2 millimole) of 4-dimethylaminopyridine was added, and the mixture was heated with stirring at 80° C. for 4 hours. The polymer solution was cooled, separated from the calcium hydroxide by filtration, and poured into 500 ml. of methanol. The precipitates thereby formed were collected by filtration, washed with methanol, and dried in a vacuum dryer.

Polymers with a number average molecular weight of 12,000 were obtained in 92% yield.

The polymers were extracted with cyclohexane, a solvent dissolving only styrene polymers, in a Soxhlet extractor. The results indicated that the cyclohexane-soluble fraction was 24% or the proportion of the unreacted polystyrene was 45%. The content of polystyrene in the insoluble fraction after the Soxhlet extraction was found to be 22% by $^1$H-NMR spectroscopy. Two glass transition points were observed at 103.5° C. and 170° C. for the copolymer in question.

EXAMPLE 8

Into a flask were introduced 2 g. (0.39 millimole) of alcoholic hydroxyl-terminated polystyrene A7, 5 ml. of 1,2-dichloroethane, and 50 μl. of triethylamine and stirred in a stream of nitrogen. To the solution was added in drops a solution of 0.62 g. (3.05 millimoles) of terephthaloyl chloride and 0.62 g. (3.05 millimoles) of isophthaloyl chloride in 3 ml. of 1,2-dichloroethane over 10 minutes so that the reaction temperature might not exceed 40° C. The mixture was thereafter stirred at room temperature for 4 hours and then allowed to react with a mixture of 1.3 g. (5.69 millimoles) of bisphenol A, 2 g. (27 millimoles) of calcium hydroxide, 5 μl. of triethylamine, and 25 ml. of 1,2-dichloroethane for 4 hours. The polymer solution was separated from the calcium hydroxide by filtration and poured into 500 ml. of methanol and the precipitates were collected by filtration, washed with methanol, and dried in a vacuum dryer.

The polymers thus obtained showed a number average molecular weight of 29,000 and their yield was 82%.

The polymers in question were extracted with cyclohexane, a solvent dissolving only styrene polymers, in a Soxhlet extractor. The results indicated that the soluble fraction was 3% or the proportion of the unreacted styrene polymers was 5%. The content of polystyrene in the insoluble fraction after the Soxhlet extraction was found to be 38% by $^1$H-NMR spectroscopy. One glass transition point was observed at 110° C. for the copolymer in question.

Films with polystyrene contents of 22 to 55% were prepared from the aromatic polyester-polystyrene block copolymers synthesized as in Examples 7 and 8, stretched 10 to 50% to furnish test specimens for the measurement of birefringence, and tested with the use of a polarizing microscope Model BH-2 manufactured by Olympus Optical Co., Ltd. The results are as follows.

| Degree of stretching | Birefringence $\Delta n_2$ (×10$^{-2}$) Polystyrene content | | |
|---|---|---|---|
| (%) | 22 | 38 | 55 |
| 10 | 0.115 | 0.0045 | 0.0047 |
| 30 | 0.162 | 0.0060 | 0.0058 |
| 50 | 0.158 | 0.0072 | 0.0065 |

Comparative Example 2

A methylene chloride solution of 203 g. of a 1:1 mixture by mole of terephthaloyl chloride and isophthaloyl chloride and 4.18 g. of methacryloyl chloride and an aqueous sodium hydroxide solution of 233 g. of bisphenol A were subjected to interfacial polymerization to prepare methacryloyl-terminated polyesters. The number average molecular weight $\overline{Mn}$ was found to be 4,000 by GPC.

The polyesters in question and styrene monomer were mixed at a weight ratio of 1:1 by heating at 130° C. in a nitrogen atmosphere and allowed to polymerize for 20 hours. The polymers formed were recovered as in Example 1 and tested for their molecular weight, composition, and content of uncopolymerized polystyrene. The results are as follows.

$\overline{Mn}$ = 7,500
$\overline{Mn}$ = 22,000
$\overline{Mw}/\overline{Mn}$ = 2.9
Extraction by cyclohexane: insolubles/solubles = 30:70
Content of polystyrene in copolymer = 25%
Content of uncopolymerized polystyrene = 70%

The polymer, in the same manner of examples 1 to 6, was dissolved in methylene chloride, and formed into a film on a glass plate, and then stripped of the solvent. After stripping the solvent, the obtained film was cooled to a room temperature and then left in water in order to peel it from the glass plate. However, the film on the glass plate was broken in pieces and any samples for a stretching test were not obtained.

As a result of the above-mentioned examples 1 to 8 and comparative examples 1 to 2, the following points are ascertained:

① From results of examples 1 to 8, it is possible to manufacture aromatic polyester-polystyrene block copolymers by the process according to the present invention.

② As compared examples 1 to 8 with the comparative example 1, aromatic polyester-polystyrene block copolymers obtained by the process according to the present invention have an excellent low birefringence even if after stretching.

③ As compared examples 1 to 8 with the comparative example 2, it is possible to decrease a content of uncopolymerized styrene polymers in aromatic polyester-polystyrene block copolymers by the process according to the present invention.

What is claimed is:

1. A process for preparing aromatic polyester-polystyrene block copolymers which comprises polycondensing in solution styrene polymers (A), aromatic dihydroxy compounds (B), and aromatic dicarboxylic acid dihalides (C) in a weight ratio (A)/[(B)+(C)] of 5/95 to 80/20, wherein said styrene polymers have terminal phenolic hydroxyl groups or terminal amino groups.

2. A process according to claim 1, wherein said styrene polymers (A) have terminal phenolic hydroxyl groups and are synthesized by esterifying carboxy-terminated styrene polymers with an excess of a diphenol.

3. A process according to claim 2, wherein said styrene polymers (A) prepared by esterification of said carboxy-terminated styrene polymers are polycondensed in solution with said aromatic dihydroxy compounds (B) and said aromatic dicarboxylic acid dihalides (C) without separating said styrene polymers (A) from the mixture resulting from said esterification.

4. A process according to claim 1, wherein said styrene polymers (A) have terminal amino groups and are synthesized by amidation of carboxy-terminated styrene polymers with an excess of a diamine.

5. A process according to claim 4, wherein said styrene polymers (A) prepared by amidation of said carboxy-terminated styrene polymers are polycondensed in solution with said aromatic dihydroxy compounds (B) and said aromatic dicarboxylic acid dihalides (C) without separating said styrene polymers (A) from the mixture resulting from said amidation.

6. A process for preparing aromatic polyester-polystyrene block copolymers which comprises treating alcoholic hydroxyl-terminated styrene polymers with a dicarboxylic acid dihalide to obtain acid halide-terminated styrene polymers (A), and then polycondensing continuously in solution the resulting mixture with aromatic dihydroxy compounds (B) and aromatic dicarboxylic acid dihalides (C) in a weight ratio (A)/[(B)+(C)] of 5/95 to 80/20, without separating said acid halide-terminated styrene polymers (A) from said resulting mixture.

* * * * *